Patented July 26, 1949

2,477,327

UNITED STATES PATENT OFFICE 2,477,327

HYDROXY ALKYL THIO SUCCINIC ACIDS AND ESTERS

Edward S. Blake, Nitro, W. Va., assignor to Monsanto Chemical Company, St. Louis, Mo., a corporation of Delaware No Drawing. Application April 18, 1947, Serial No. 742,468

11 Claims. (Cl. 260—481)

The present invention relates to new and useful compositions of matter, namely hydroxy alkyl thio succinic acids and esters thereof. Since the novel compounds contain a hydroxyl or basic constituent as well as carboxyl constituents, they are versatile and important intermediates.

An object of this invention is to provide hydroxy acids and esters thereof which contain sulfur. Further objects will appear hereinafter.

For some purposes, as for example the manufacture of agents for increasing the load carrying capacity of mineral oil lubricants and to reduce wear, the presence of sulfur is desirable. The new compounds contain sulfur without possessing the objectionable odor characteristic of many sulfur compounds.

The compounds of the present invention possess the structure

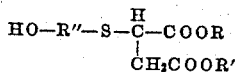

where R'' is an alkylene group and where R and R' represent hydrogen or the same or different alkyl, aralkyl or aryl groups. Typical examples of R and R' comprise methyl, ethyl, n-propyl, isopropyl, isobutyl, tertiary butyl, n-butyl, amyl, hexyl, octyl, decyl, lauryl, benzyl, phenyl, tetra hydrofurfuryl, oleyl, allyl, octadecyl, and pentadecyl groups.

Compounds of this type may be prepared by the addition of hydroxyl substituted alkyl mercaptans to unsaturated dicarboxylic acids and esters. Suitable mercaptans comprise mercapto ethanol, mercapto propanol. and mercapto butanol.

The more detailed practice of the invention is illustrated by the following examples. The invention is not limited to these specific embodiments which are merely furnished for purposes of illustration, there being many other forms of the invention.

Example I

Dioleyl maleate was condensed with mercapto ethanol employing sodium methylate as a catalyst. The charge consisted of 61.6 parts by weight (substantially 0.1 molecular proportion) of dioleyl maleate, 7.8 parts by weight (substantially 0.1 molecular proportion) of mercapto ethanol and 3.0 parts by weight of sodium methylate. The mixture was stirred for about 5 hours during which time the temperature rose to a maximum of 50° C. due to the exothermic reaction which took place. Dilute acid was added to destroy the catalyst and the organic layer dissolved in a suitable water immiscible solvent and washed with water until neutral. The neutral solution was dried over anhydrous sodium sulfate, filtered through a bed of Attapulgus clay, and the solvent removed by distillation, the final liquid temperature being 90° C. at 2 mm. The residue consisted of 67.8 parts by weight of a light yellow oil believed to comprise dioleyl hydroxy ethyl thio succinate.

Example II

Dilorol maleate was condensed with mercapto ethanol employing sodium methylate as a catalyst. Lorol is the mixture of monohydric "coconut alcohols" obtained by hydrogenation of coconut oil or oil acids and consists predominantly of $C_{12}$ alcohols. The charge consisted of 96 parts by weight of dilorol maleate, 15.6 parts by weight of mercapto ethanol, and 6.0 parts by weight of sodium methylate. An exothermic reaction set in immediately and the temperature rose to 65° C. The product was isolated and purified as in the preceding example to obtain 107.5 parts by weight of a light yellow oil believed to comprise dilorol hydroxy ethyl thio succinate.

Example III 114 parts by weight of butyl maleate (substantially 0.5 molecular proportion) was admixed with 39 parts by weight of mercapto ethanol (substantially 0.5 molecular proportion). Upon the addition of 2.5 parts by weight of sodium methylate a very vigorous, strongly exothermic reaction set in. The mixture was stirred about 1½ hours and then dissolved in a mixture of benzene and petroleum ether, acidified, and washed free of acid. The neutral solution was dried over anhydrous sodium sulfate and filtered through a bed of Attapulgus clay. The solvent was removed by distillation, the final liquid temperature being 140° C./1 mm. There was obtained 147 parts by weight of a colorless clear liquid free from mercaptan odor believed to comprise dibutyl hydroxy ethyl thio succinate.

Example IV 85 parts by weight of di-2-ethyl hexyl maleate (substantially 0.25 molecular proportion) was admixed with 19.5 parts by weight of mercapto ethanol (substantally 0.25 molecular proportion). 1.5 parts by weight of sodium ethylate were added to the mixture whereupon a vigorous exothermic reaction set in and the temperature rose to 80° C., cooling being applied to prevent a further temperature rise. The reaction mixture was stirred for 8 hours, then diluted with ether, washed thoroughly and the solvent removed by distillation. The residue was heated under reduced pressure to 140° C./1 mm. to remove the last traces of low boiling materials. There was obtained 100 parts by weight of a clear liquid product believed to comprise di-2-ethyl hexyl hydroxy ethyl thio succinate.

*Example V*

A mixture of 172 parts by weight of diethyl maleate and 78 parts by weight of mercapto ethanol (substantially one molecular proportion of each) was added with cooling to approximately 0.71 part by weight of diethyl amine. The maximum temperature rise was 65° C. The charge was stirred about 8½ hours during which time the temperature dropped to 27° C. The product was then distilled under reduced pressure, collecting the fraction boiling at 160-162° C./1.5 mm. which consisted of 221.5 parts by weight of a clear mobile liquid. The product was believed to be diethyl hydroxy ethyl thio succinate.

The temperature of the reactions may vary from that at which the reaction begins to be detectable, which is at room temperature and below in the presence of a catalyst, up to the decomposition temperature of the products. The lower members are distillable liquids whereas the higher members are preferably isolated by other methods.

Basic compounds stable at reaction temperature may be employed as catalysts. They include in addition to diethyl amine and sodium methylate mentioned above such compounds as piperidine, morpholine, aniline, butyl amine, triethyl amine, cyclohexylamine, sodium acetate, sodium hydroxide, ammonia, sodium carbonate, and tetra methyl ammonium hydroxide.

Any modification or variation from the above description and examples which conforms to the spirit of the invention is intended to be included within the scope of the claims.

What is claimed is:

1. A compound of the structure $$\begin{array}{c} \quad\quad\quad\; H \\ HO-R''-S-C-COOR \\ \quad\quad\quad\; HC-COOR' \\ \quad\quad\quad\; H \end{array}$$

where R and R' are selected from a group consisting of hydrogen, alkyl, aralkyl and aryl groups and R'' represents an alkylene group containing more than one but less than five carbon atoms.

2. A compound of the structure

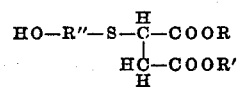

where R and R' represent like alkyl groups.

3. A compound of the structure

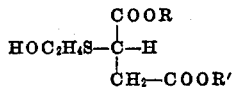

where R and R' are like long chain alkyl groups containing at least eight but not more than eighteen carbon atoms.

4. A compound of the structure

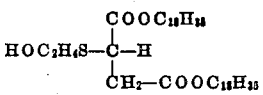

5. A compound of the structure

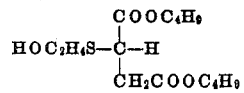

6. A compound of the structure

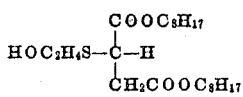

7. The process of preparing an hydroxy alkyl thio succinic acid which comprises reacting an hydroxy alkyl mercaptan containing more than one but less than five carbon atoms in an alkaline medium comprising a basic condensation catalyst with a compound of the structure

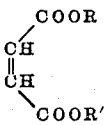

where R and R' are selected from a group consisting of hydrogen, alkyl, aralkyl and aryl groups.

8. The process of preparing an hydroxy alkyl thio succinic acid ester which comprises reacting an hydroxy alkyl mercaptan containing more than one but less than five carbon atoms with an ester of maleic acid containing two like ester forming groups of not more than eighteen carbon atoms.

9. The process of preparing an hydroxy ethyl thio succinic acid ester which comprises reacting mercapto ethanol with an ester of maleic acid containing two like ester forming groups of not more than eighteen carbon atoms.

10. The process of preparing an hydroxy ethyl thio succinic acid ester which comprises reacting mercapto ethanol with an ester of maleic acid containing two like ester forming groups of not more than eighteen carbon atoms in the presence of a basic condensation catalyst.

11. The process of preparing an hydroxy ethyl thio succinic acid ester which comprises reacting mercapto ethanol with a dialkyl ester of maleic acid in the presence of a basic condensation catalyst.

EDWARD S. BLAKE.

REFERENCES CITED

The following references are of record in the file of this patent:

UNITED STATES PATENTS

| Number | Name | Date |
|---|---|---|
| 2,397,960 | Gribbins et al. | Apr. 9, 1946 |
| 2,416,100 | Karrer | Feb. 18, 1947 |
| 2,424,007 | Moore et al. | July 15, 1947 |

OTHER REFERENCES

Chemical Abstracts, vol. 33 (1939), pages 2105-2106 (1 page). (Copy in U. S. Pat. Off. Scientific Library, Washington, D. C.)